(12) United States Patent
Sugiyama et al.

(10) Patent No.: US 8,742,718 B2
(45) Date of Patent: Jun. 3, 2014

(54) CHARGING APPARATUS FOR VEHICLE

(75) Inventors: Yoshinobu Sugiyama, Toyota (JP);
Wanleng Ang, Okazaki (JP)

(73) Assignee: Toyota Jidosha Kabushiki Kaisha,
Toyota (JP)

( * ) Notice: Subject to any disclaimer, the term of this patent is extended or adjusted under 35 U.S.C. 154(b) by 0 days.

(21) Appl. No.: 13/876,599

(22) PCT Filed: Nov. 19, 2010

(86) PCT No.: PCT/JP2010/070684
§ 371 (c)(1),
(2), (4) Date: Mar. 28, 2013

(87) PCT Pub. No.: WO2012/066675
PCT Pub. Date: May 24, 2012

(65) Prior Publication Data
US 2013/0221920 A1  Aug. 29, 2013

(51) Int. Cl.
*H02J 7/00* (2006.01)
*H02J 7/14* (2006.01)
*B60L 11/18* (2006.01)

(52) U.S. Cl.
CPC ......... *B60L 11/1811* (2013.01); *B60L 11/1824* (2013.01); *B60L 11/1814* (2013.01)
USPC ........... 320/104; 320/109; 320/140; 320/134; 320/136; 307/10.1

(58) Field of Classification Search
CPC ............ B60L 11/1824; B60L 11/1809; B60L 11/1811; B60L 11/1812; B60L 11/1816; B60L 11/1864
USPC ......... 320/104, 109, 107, 111, 137, 139, 140, 320/134, 135, 136; 307/10.1; 180/65.1
See application file for complete search history.

(56) References Cited

U.S. PATENT DOCUMENTS

| | | | | |
|---|---|---|---|---|
| 6,114,775 | A * | 9/2000 | Chung et al. | 307/10.1 |
| 7,468,565 | B2 * | 12/2008 | Hoshiba | 307/10.1 |
| 2002/0190695 | A1 * | 12/2002 | Wall et al. | 322/17 |
| 2003/0029654 | A1 * | 2/2003 | Shimane et al. | 180/65.4 |

(Continued)

FOREIGN PATENT DOCUMENTS

| | | |
|---|---|---|
| JP | A-8-107606 | 4/1996 |
| JP | A-2007-89328 | 4/2007 |

(Continued)

*Primary Examiner* — Edward Tso
*Assistant Examiner* — Alexis Boateng
(74) *Attorney, Agent, or Firm* — Oliff PLC

(57) ABSTRACT

A vehicle is equipped with a main battery, an auxiliary machinery battery, a high-capacitance DC/DC converter which converts power on an electric path between the main battery and a motor-generator for traveling to supply the converted power to the auxiliary machinery battery, a low-capacitance sub power supply which converts power on an electric path between the main battery and an external power supply to supply the converted power to the auxiliary machinery battery, and a control device which controls the sub power supply. The control device determines whether or not the DC/DC converter has an abnormality, and operates the sub power supply to perform precharging when it is determined that the DC/DC converter is abnormal. An auxiliary machinery battery voltage V2 when precharging has been performed is set to a value which is higher by a predetermined voltage a than an auxiliary machinery battery voltage V1 when precharging has not been performed.

6 Claims, 3 Drawing Sheets

(56) References Cited

U.S. PATENT DOCUMENTS

| | | | |
|---|---|---|---|
| 2009/0153387 A1* | 6/2009 | Tayu | 341/159 |
| 2010/0080022 A1* | 4/2010 | Schmidt | 363/53 |
| 2011/0187184 A1* | 8/2011 | Ichikawa | 307/10.1 |

FOREIGN PATENT DOCUMENTS

| | | |
|---|---|---|
| JP | A-2009-225587 | 10/2009 |
| JP | A-2010-93891 | 4/2010 |
| JP | A-2010-279159 | 12/2010 |

* cited by examiner

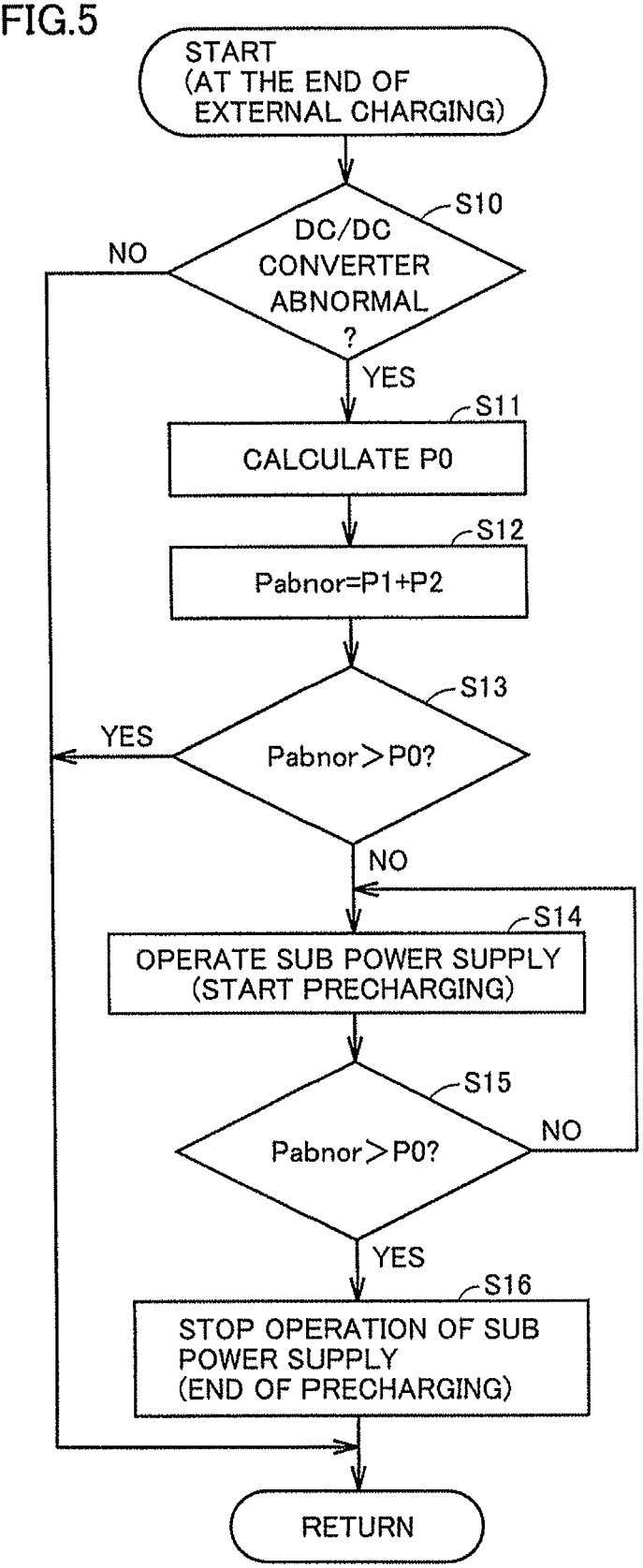

CHARGING APPARATUS FOR VEHICLE

TECHNICAL FIELD

The present invention relates to charging of an auxiliary machinery battery mounted on a vehicle which is connectable to an external power supply.

BACKGROUND ART

In recent years, an electric vehicle which can use power of a power supply external to the vehicle (external power supply) to charge a main battery which stores power for operating a motor for traveling (what is called plug-in vehicle) is in practical use. With respect to such plug-in vehicles, for example, Japanese Patent Laying-Open No. 2009-225587 (PTL 1) discloses a plug-in vehicle which includes, apart from a main converter which is provided on an electric path between a main battery and a motor for traveling and capable of charging an auxiliary machinery battery with the power of the main battery, a sub-converter which is provided on an electric path between the main battery and an external power supply and capable of directly charging the auxiliary machinery battery with the power of the external battery.

CITATION LIST

Patent Literature

PTL 1: Japanese Patent Laying-Open No. 2009-225587

SUMMARY OF INVENTION

Technical Problem

However, PTL 1 does not specifically describe what to do if the main converter fails, at all. PTL 1 also discloses nothing about use of a low-capacitance sub-converter as the sub converter. In the plug-in vehicle disclosed in PTL 1, if the main converter has failed during traveling, then the sub-converter may be operated instead of the main converter to replenish power consumption of auxiliary machinery; however, when the sub-converter has a low capacitance, it can fail to sufficiently replenish power, resulting in overdischarging of the auxiliary machinery battery.

The present invention has been made to solve the problems above, and an object of the invention is to prevent an auxiliary machinery battery from overdischarging when a main converter is abnormal even when a sub-converter having a low capacitance is employed.

Solution to Problem

A charging apparatus according to the present invention is a charging apparatus for a vehicle equipped with a first power supply storing power for operating a motor for driving the vehicle, a second power supply storing power for operating auxiliary machinery of the vehicle, and a connector configured to be connectable to an external power supply external to the vehicle. The charging apparatus includes: a first converter converting power on an electric path between the first power supply and the motor and supplying the converted power to the second power supply; a second converter having a lower capacitance than that of the first converter, converting power on an electric path between the first power supply and the connector, and supplying the converted power to the second power supply; and a control device controlling the second converter. When the first converter is abnormal, the control device performs precharging that causes the second converter to operate such that the second power supply has a greater voltage or amount of power stored than when the first converter is normal.

Preferably, the control device determines whether or not the first converter is abnormal while the vehicle is stopped with the external power supply connected to the connector, and performs the precharging before the vehicle starts traveling when it is determined that the first converter is abnormal.

Preferably, the control device performs the precharging when it is determined that the first converter is abnormal while the vehicle is stopped and it is predicted that total energy of outputtable energy of the second power supply in one trip and convertable energy of the second converter in one trip is less than necessary energy for the auxiliary machinery in one trip.

Preferably, the control device stops the precharging once the total energy gets greater than the necessary energy by the precharging.

Preferably, the control device stops the precharging once a voltage of or amount of power stored in the second power supply reaches a predetermined value by the precharging.

Preferably, the vehicle is further equipped with a charger provided on the electric path between the first power supply and the connector and converting power of the external power supply into power that can be charged into the first power supply, and the second converter is provided between the charger and the second power supply.

Advantageous Effects of Invention

According to the present invention, even when a second converter (sub-converter) having a lower capacitance (rated power) than that of a first converter (main converter) is employed, it is possible to prevent a second power supply (auxiliary machinery battery) from overdischarging when the first converter is abnormal.

BRIEF DESCRIPTION OF DRAWINGS

FIG. 5 is a flow chart showing a process procedure of the ECU.

DESCRIPTION OF EMBODIMENTS

Figure 1:
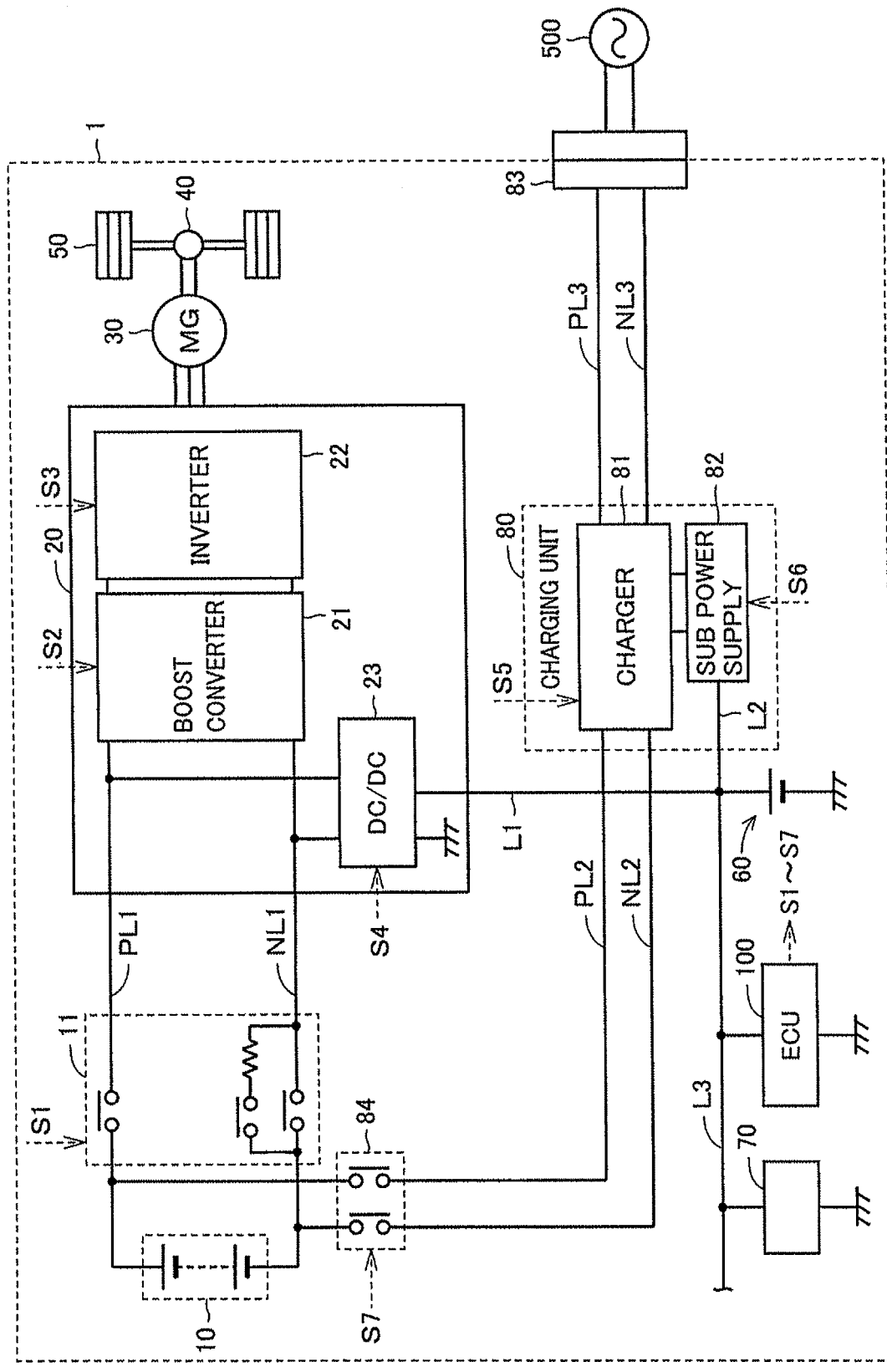
FIG. 1 is an overall block diagram of a vehicle.

An embodiment of the present invention will be hereinafter described in detail with reference to the drawings. In the drawings, the same or corresponding portions have the same reference signs allotted, and their description will not be repeated. FIG. 1 is an overall block diagram of a vehicle 1 on which a charging apparatus according to the present embodiment is mounted. Vehicle 1 includes a main battery 10, a system main relay (hereinafter referred to as "SMR") 11, a power control unit (hereinafter referred to as "PCU") 20, a motor-generator (hereinafter referred to as "MG") 30, a motive power transmission gear 40, drive wheels 50, an auxiliary machinery battery 60, an auxiliary load 70, a charging unit 80, and a control device (hereinafter referred to as "ECU") 100.

MG 30 is an AC rotating electric machine which generates driving force causing vehicle 1 to travel. The output torque of MG 30 is transmitted via motive power transmission gear 40 to drive wheels 50 to cause vehicle 1 to travel. During regenerative breaking of vehicle 1, MG 30 can generate electricity by rotational force of the drive wheels 50. The generated electric power is then converted by PCU 20 into power for charging main battery 10. It is noted that although FIG. 1 illustrates a case where one MG 30 is provided, the number of motor-generators may be more than one. In addition, as a motive power source, the vehicle may include an engine besides MG 30. That is, vehicle 1 in the present embodiment is applicable to vehicles in general that obtain driving force on electric power, such as electrically powered vehicles, hybrid vehicles, and fuel cell vehicles.

Main battery 10 is a DC power supply which stores power for operating MG 30. Main battery 10 is a secondary battery such as a lithium ion battery and a nickel-metal hydride battery. It is noted that main battery 10 may be an electric double layer capacitor.

Main battery 10 is connected via a positive electrode line PL1 and a negative electrode line NL1 to a boost converter 21 of PCU 20. Main battery 10 supplies power for operating MG 30 to PCU 20. The voltage of main battery 10 has a relatively high value, for example, of the order of 200 volts.

SMR 11 is controlled by a control signal S1 from ECU 100 and makes a switch between supply and interruption of power between main battery 10 and PCU 20.

PCU 20 includes boost converter 21, an inverter 22, and a DC/DC converter 23.

Boost converter 21 is controlled by a control signal S2 from ECU 100, converts the voltage of main battery 10 into a voltage equal to or more than the voltage of main battery 10 and supplies the converted voltage to inverter 22.

Inverter 22 is controlled by a control signal S3 from ECU 100, converts DC power supplied via boost converter 21 from main battery 10 into AC power that can operate MG 30, and supplies the converted voltage to MG 30. MG 30 is thereby operated on the power of main battery 10.

DC/DC converter 23 is controlled by a control signal S4 from ECU 100, steps down a voltage between positive electrode line PL1 and negative electrode line NL1 (that is, the high voltage of main battery 10) to the voltage of auxiliary machinery battery 60 (a low voltage of the order of twelve volts), and supplies the stepped-down voltage via power line L1 to auxiliary machinery battery 60. Auxiliary machinery battery 60 is thereby charged with the power of main battery 10.

Auxiliary machinery battery 60 is typically configured to include a lead storage battery. Auxiliary machinery battery 60 is a DC power supply which stores power for operating auxiliary machinery (such as auxiliary load 70 and ECU 100) of vehicle 1. The voltage of auxiliary machinery battery 60 has a relatively low value of the order of twelve volts, as described above. Hereinafter, auxiliary machinery battery 60 and electrical equipment that operates on the power of auxiliary machinery battery 60 are also collectively referred to as a "low voltage system".

Auxiliary load 70 is electrical equipment of the low voltage system. Auxiliary load 70 is configured of, for example, an air conditioning unit, an audio unit, lamps, a wiper, a heater, and the like.

Further, vehicle 1 includes charging unit 80, an inlet 83, and a charge relay 84, as a configuration for externally charging main battery 10 with AC power (hereinafter also referred to as "external power") from an external power supply 500.

Inlet 83 is provided at a body of vehicle 1 so as to receive AC power from external power supply 500. Inlet 83 is configured such that a connector of external power supply 500 can be connected thereto.

Charging unit 80 includes a charger 81 and a sub power supply 82.

Charger 81 is connected via a positive electrode line PL2 and a negative electrode line NL2 to main battery 10 and via a positive electrode line PL3 and a negative electrode line NL3 to inlet 83. Charger 81 is controlled by a control signal S5 from ECU 100, converts external power (AC power) input to inlet 83 into power that can be charged into main battery 10 (DC 200 volts), and supplies the converted power to main battery 10. External charging is thereby performed.

Sub power supply 82 is a power converter provided between charger 81 and auxiliary machinery battery 60. Sub power supply 82 is configured to be able to convert external power supplied from inlet 83 to charger 81 (which may be AC power which has not yet been converted by charger 81 or may be DC power which has been converted by charger 81) and DC power supplied from main battery 10 to charger 81 into power (of DC of the order of twelve volts) that can be supplied to the low voltage system. The power converted by sub power supply 82 is supplied via a power line L2 to the low voltage system.

Sub power supply 82 functions as a power supply for supplying power to the low voltage system during external charging. That is, during external charging, SMR 11 is turned off as will be described later, and no power can be supplied from DC/DC converter 23 to auxiliary machinery battery 60. Therefore, during external charging, power is supplied from sub power supply 82 to the low voltage system.

The capacitance (rated power) of sub power supply 82 is set to a value less than the capacitance of DC/DC converter 23. That is, while the vehicle is traveling, a user uses the air conditioning unit, the audio unit, and the like, and therefore, the power consumption of the low voltage system tends to be high. Since DC/DC converter 23 primarily serves to supply power to the low voltage system while the vehicle is traveling, the capacitance of DC/DC converter 23 is set to a large value (for example, of the order of two kilowatts). In contrast, during external charging, a user less frequently uses the air conditioning unit, the audio unit, and the like, and the power consumption of the low voltage system tends to be lower than while the vehicle is traveling. Since sub power supply 82 primarily serves to supply power to the low voltage system during external charging, in consideration of conversion efficiency, the capacitance of sub power supply 82 is set to a value less than the capacitance of DC/DC converter 23 (for example, of the order to 200 watts).

Charge relay 84 is controlled by a control signal S7 from ECU 100 and makes a switch between supply and interruption of power between main battery 10 and charger 81.

Further, vehicle 1 includes a plurality of sensors (all not shown) which detect information necessary to control traveling of vehicle 1, such as the statuses (such as voltage, current, temperature, and the like) of main battery 10 and auxiliary machinery battery 60, accelerator pedal position, vehicle speed, and the like. Each sensor outputs a detection result to ECU 100.

ECU 100 includes a CPU (Central Processing Unit) and a memory, generates control signals S1-S7 described above in response to information stored in the memory, detection results by the sensors, and the like, and outputs each of the generated signals to corresponding equipment. It is noted that although ECU 100 is a single unit in FIG. 1, ECU 100 may be divided by function.

When performing external charging, ECU 100 turns charge relay 84 on to connect a charging path between main battery 10 and charging unit 80. ECU 100 then operates charger 81 to convert external power into the power that can be charged into main battery 10 and supplies the converted power to main battery 10. In doing so, in consideration of the life of PCU 20, ECU 100 turns SMR 11 off (that is, an electric path between main battery 10 and PCU 20 is interrupted).

During external charging, ECU 100 operates sub power supply 82 to convert external power into the power that can be supplied to the low voltage system and supplies the converted power to the low voltage system. The low voltage system that needs to be operated during external charging can thereby be operated with use of external power, and the power consumption of auxiliary machinery battery 60 can be suppressed. In this way, during external charging, in addition to auxiliary machinery battery 60, sub power supply 82 can also supply power to the low voltage system.

In contrast, when vehicle 1 is allowed to travel, ECU 100 controls PCU 20 with SMR 11 turned on, thereby operating MG 30 with the power of main battery 10. In doing so, when the voltage of (amount of power stored in) auxiliary machinery battery 60 falls below a target value, ECU 100 charges auxiliary machinery battery 60 by operating DC/DC converter 23 or by turning charge relay 84 on to operate sub power supply 82. In this way, while the vehicle is traveling, in addition to auxiliary machinery battery 60, DC/DC converter 23 and sub power supply 82 can also supply power to the low voltage power system. That is, while the vehicle is traveling, DC/DC converter 23 functions as a main converter, and sub power supply 82 functions as a sub-converter.

Figure 2:
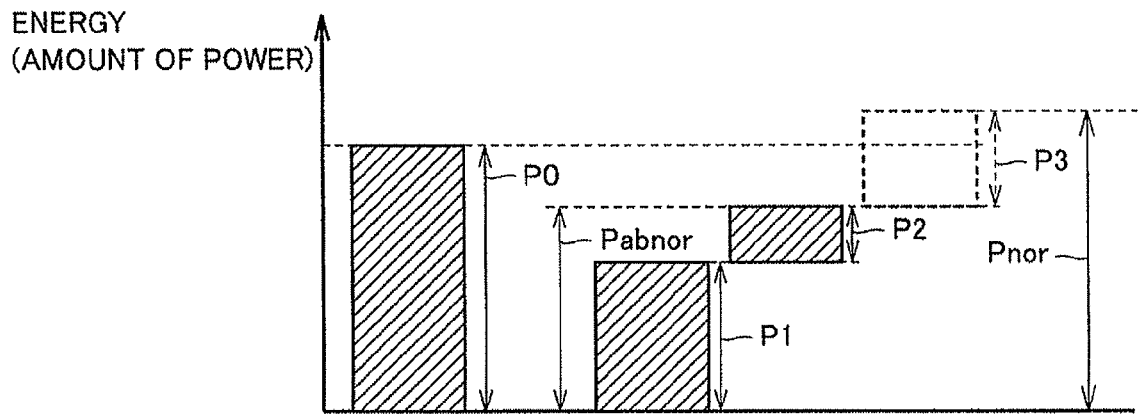
FIG. 2 is a diagram showing an image of energy balance of a low voltage system.

FIG. 2 is a diagram showing an image of energy (amount of power stored) balance of the low voltage system in one trip. Given that the energy that auxiliary machinery battery 60 can output in one trip is "P1", that the energy that sub power supply 82 can convert in one trip is "P2", and that the energy that DC/DC converter 23 can convert in one trip is "P3", then the energy Pnor that the low voltage system can consume in one trip when DC/DC converter 23 operates normally (hereinafter also referred to simply as "when normal") is the sum of P1, P2, and P3. In contrast, the energy Pabnor that the low voltage system can consume in one trip when DC/DC converter 23 has failed (hereinafter also referred to simply as "when abnormal") is the sum of P1 and P2, which is lower by the amount of P3 than when normal. When such consumable energy Pabnor is less than the energy P0 that is necessary for the low voltage system in one trip, the low voltage system can be in short of power on that trip, resulting in overdischarging of auxiliary machinery battery 60. In particular, sub power supply 82 has a low capacitance of the order of 200 watts and cannot sufficiently secure convertable energy P2, and therefore, there is a higher possibility of power shortage in the low voltage system.

Hence, ECU 100 according to the present embodiment determines whether or not DC/DC converter 23 is abnormal at the end of external charging, and when abnormal, operates sub power supply 82 as necessary to make the voltage of auxiliary machinery battery 60 prior to the start of traveling higher than when normal. The energy that is predicted to be in short in the next trip (=energy corresponding to P0−Pabnor) can thereby be stored in advance in auxiliary machinery battery 60 in preparation for the next trip. Hereinafter, such charging of auxiliary machinery battery 60 can be also referred to as "precharging". It is the most characteristic feature of the present embodiment that such precharging is performed.

Figure 3:
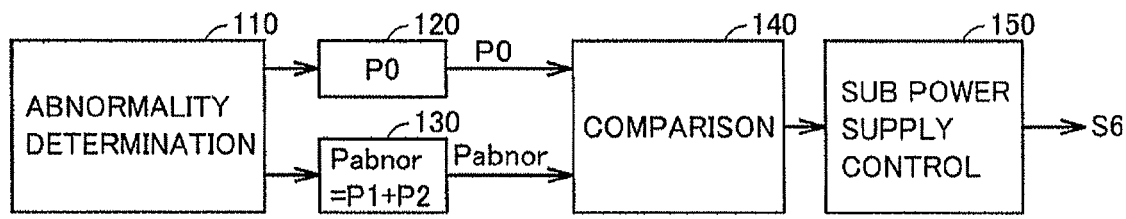
FIG. 3 is a functional block diagram of an ECU.

FIG. 3 is a functional block diagram of part of ECU 100 involved with precharging. Each functional block shown in FIG. 3 may be realized by hardware or may be realized by software.

ECU 100 includes a determination unit 110, calculation units 120, 130, a comparison unit 140, and a control unit 150.

Determination unit 110 determines whether or not DC/DC converter 23 has an abnormality, at the end of external charging (when external charging causes an amount of power stored in main battery 10 to reach a target value). This determination may be made based on whether or not there is a record indicating that DC/DC converter 23 failed in the previous trips, or may be made based on a result of actually connecting SMR 11 and operating DC/DC converter 23.

When DC/DC converter 23 is abnormal, calculation unit 120 calculates necessary energy P0 for the low voltage system in the next trip. Necessary energy P0 can be calculated, for example, by predicting the energy consumption of the low voltage system on the way to the next trip's destination which is input by a user. It is also possible to predict necessary energy P0 based on the average value of necessary energy P0 per past trip.

Calculation unit 130 calculates outputtable energy P1 of auxiliary machinery battery 60 in the next trip and convertable energy P2 of sub power supply 82 in the next trip. Since the amount of power stored in auxiliary machinery battery 60 has a positive correlation with the voltage of auxiliary machinery battery 60, outputtable energy P1 of auxiliary machinery battery 60 in the next trip can be calculated, for example, based on the voltage of auxiliary machinery battery 60. Convertable energy P2 of sub power supply 82 in the next trip can be predicted, for example, based on the capacitance of sub power supply 82 (200 watts) and a time period of the next trip. The time period of the next trip can be predicted, for example, based on the distance to the destination, how crowded roads are, or the average value of a time period per past trip. It is noted that techniques for calculating P1, P2 are not limited to these techniques.

Calculation unit 130 then calculates the total energy of outputtable energy P1 of auxiliary machinery battery 60 and convertable energy P2 of sub power supply 82, which is as consumable energy Pabnor in the next trip when abnormal.

Comparison unit 140 compares necessary energy P0 and consumable energy Pabnor and outputs the result to control unit 150.

Based on the comparison result from comparison unit 140, control unit 150 controls sub power supply 82. When consumable energy Pabnor is less than necessary energy P0, control unit 150 generates control signal S6 for performing precharging and outputs the generated signal to sub power supply 82. Precharging using external power is thereby performed, and the voltage of (amount of power stored in) auxiliary machinery battery 60 increases, and outputtable energy P1 of auxiliary machinery battery 60 increases. As a result, consumable energy Pabnor of the low voltage system also increases. Control unit 150 stops precharging once consumable energy Pabnor reaches necessary energy P0.

Figure 4:
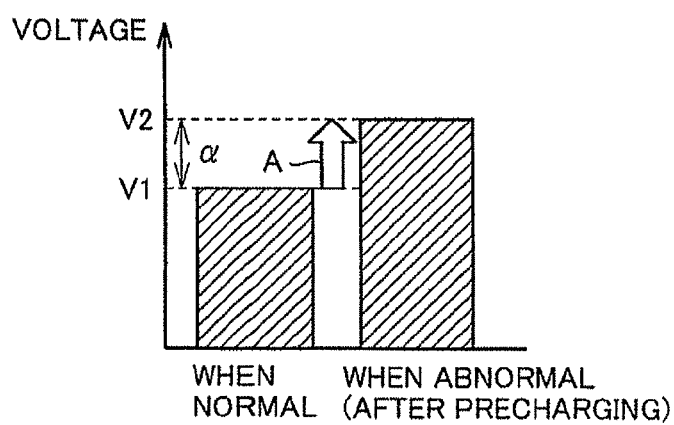
FIG. 4 is a diagram comparing an auxiliary machinery battery voltage V1 prior to the start of traveling when no precharging has been performed and an auxiliary machinery battery voltage V2 prior to the start of traveling when precharging has been performed.

FIG. 4 is a diagram comparing an auxiliary machinery battery voltage V1 prior to the start of traveling when no precharging has been performed (when normal) and an auxiliary machinery battery voltage V2 prior to the start of traveling when precharging has been performed (when abnormal). As shown in FIG. 4, by precharging, auxiliary machinery battery voltage V2 prior to the start of traveling when abnormal, is set to a value which is higher by a predetermined voltage a than auxiliary machinery battery voltage V1 prior to the start of traveling when normal (see an arrow A). This results in that electrical energy corresponding to an amount of increase in voltage a due to precharging (=V2−V1) is preliminary charged into auxiliary machinery battery 60 in preparation for the next trip. Therefore, even when sub power supply 82 has a low capacitance and cannot sufficiently secure convertable energy P2, overdischarging of auxiliary machinery battery 60 is prevented.

In particular, in the present embodiment, in which precharging is performed at the end of external charging, when external charging ends, vehicle 1 is stopped with external power supply 500 connected to inlet 83. Hence, precharging can be performed using external power rather than the power of main battery 10, and a decrease in power of main battery 10 due to precharging can be suppressed.

FIG. 5 is a flow chart showing a process procedure of ECU 100 for realizing the above-described functions. This flowchart is carried out at the end of external charging.

In step 10 (hereinafter step is abbreviated as "S"), ECU 100 determines whether or not DC/DC converter 23 has an abnormality. If DC/DC converter 23 is abnormal (YES in S10), then the process shifts to S11. If not (NO in S10), then the process ends.

In S11, ECU 100 calculates necessary energy P0 for the low voltage system in the next trip.

In S12, ECU 100 calculates the total energy of outputtable energy P1 of auxiliary machinery battery 60 in the next trip and convertable energy P2 of sub power supply 82 in the next trip, which is consumable energy Pabnor of the low voltage system in the next trip when abnormal.

In S13, ECU 100 determines whether or not consumable energy Pabnor calculated in S12 is greater than necessary energy P0 calculated in S11 (whether or not Pabnor>P0). If Pabnor>P0 (YES in S13), then the process ends. If Pabnor<P0 (NO in S13), then the process shifts to S14.

In S14, ECU 100 operates sub power supply 82 and starts precharging.

In S15, ECU 100 determines whether or not precharging has caused consumable energy Pabnor to be greater than necessary energy P0. If consumable energy Pabnor is still less than necessary energy P0 (NO in S15), then the process returns to S14, and precharging is continued.

On the other hand, if consumable energy Pabnor has become greater than necessary energy P0 (YES in S15), then ECU 100 shifts the process to S16 and stops sub power supply 82 to end precharging.

As above, when DC/DC converter 23 is abnormal at the end of external charging, in preparation for the next trip, ECU 100 according to the present embodiment performs precharging that causes sub power supply 82 to operate to make the voltage of (amount of power stored in) auxiliary machinery battery 60 higher than when normal. The electric energy of the low voltage system that is predicted to be in short in the next trip due to the abnormality of DC/DC converter 23 can thereby be stored in advance in auxiliary machinery battery 60 prior to the next trip. Therefore, even when sub power supply 82 has a low capacitance and cannot sufficiently secure convertable energy P2, overdischarging of auxiliary machinery battery 60 is prevented, and causing the low voltage system to be no longer operable on the next trip can be suppressed.

It is noted that in the present embodiment, although the case where precharging is performed at the end of external charging has been described, the timing at which precharging is performed is not limited thereto. For example, the timing at which precharging is performed can be prior to or during external charging or can even be during traveling of the vehicle. It is noted that in order to suppress a decrease in power of main battery 10 due to precharging, it is desirable to perform precharging with external power supply 500 connected to inlet 83.

In addition, although the present embodiment has described the case where consumable energy Pabnor and necessary energy P0 are employed for the conditions for the start of and end of precharging, the conditions for the start of and end of precharging may be simpler. For example, precharging may be started when DC/DC converter 23 is abnormal and stopped once the voltage of or amount of power stored in auxiliary machinery battery 60 reaches a predetermined value (a value higher than a target voltage or target amount of power stored when normal).

It should be understood that the embodiment disclosed herein is illustrative and non-restrictive in every respect. The scope of the present invention is defined by the terms of the claims rather than the description above, and is intended to include any modifications within the scope and meaning equivalent to the terms of the claims.

REFERENCE SIGNS LIST 1 vehicle; 10 main battery; 20 PCU; 21 boost converter; 22 inverter; 23 DC/DC converter; 40 motive power transmission gear; 50 drive wheel; 60 auxiliary machinery battery; 70 auxiliary load; 80 charging unit; 81 charger; 82 sub power supply; 83 inlet; 84 charge relay; 100 ECU; 110 determination unit; 120, 130 calculation unit; 140 comparison unit; 150 control unit; 500 external power supply.

The invention claimed is:

1. A charging apparatus for a vehicle equipped with a first power supply storing power for operating a motor for driving the vehicle, a second power supply storing power for operating auxiliary machinery of the vehicle, and a connector configured to be connectable to an external power supply external to the vehicle, the charging apparatus comprising:
 a first converter converting power on an electric path between said first power supply and said motor and supplying the converted power to said second power supply;
 a second converter having a lower capacitance than that of said first converter, converting power on an electric path between said first power supply and said connector, and supplying the converted power to said second power supply; and
 a control device controlling said second converter,
 when said first converter is abnormal, said control device performing precharging causing said second converter to operate such that said second power supply has a greater voltage or amount of power stored than when said first converter is normal.

2. The charging apparatus for a vehicle according to claim 1, wherein
 said control device determines whether or not said first converter is abnormal while said vehicle is stopped with said external power supply connected to said connector, and performs said precharging before said vehicle starts traveling when it is determined that said first converter is abnormal.

3. The charging apparatus for a vehicle according to claim 2, wherein
 said control device performs said precharging when it is determined that said first converter is abnormal while said vehicle is stopped and it is predicted that total energy of outputtable energy of said second power supply in one trip and convertable energy of said second converter in one trip is less than necessary energy for said auxiliary machinery in one trip.

4. The charging apparatus for a vehicle according to claim 3, wherein
said control device stops said precharging once said total energy gets greater than said necessary energy by said precharging.

5. The charging apparatus for a vehicle according to claim 2, wherein
said control device stops said precharging once a voltage of or amount of power stored in said second power supply reaches a predetermined value by said precharging.

6. The charging apparatus for a vehicle according to claim 1, wherein
said vehicle is further equipped with a charger provided on the electric path between said first power supply and said connector and converting power of said external power supply into power that can be charged into said first power supply, and
said second converter is provided between said charger and said second power supply.

* * * * *